No. 745,559. PATENTED DEC. 1, 1903.
G. M. BEARD.
CLUTCH.
APPLICATION FILED MAR. 24, 1903.
NO MODEL. 2 SHEETS—SHEET 1.
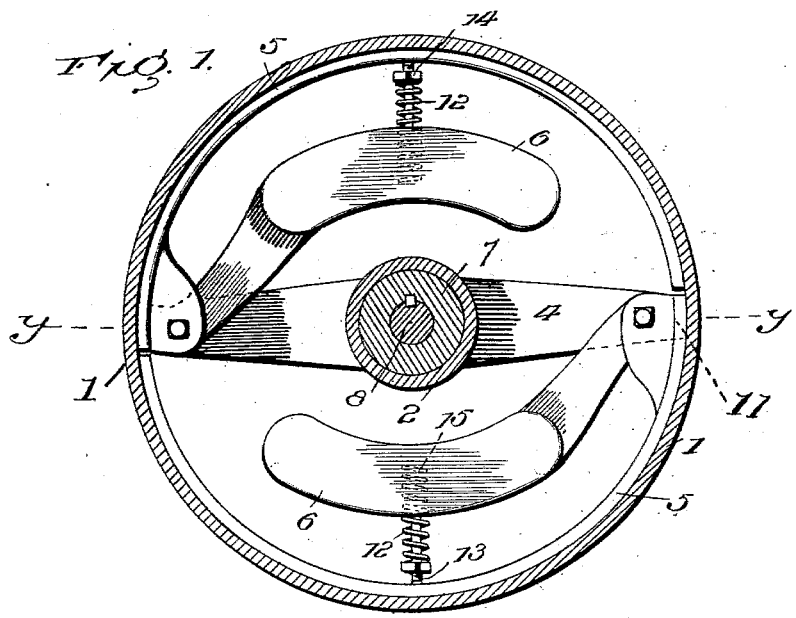
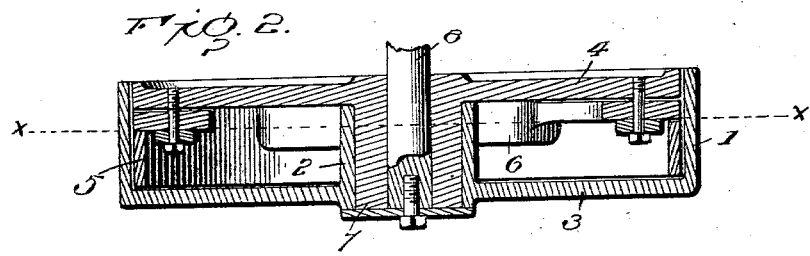
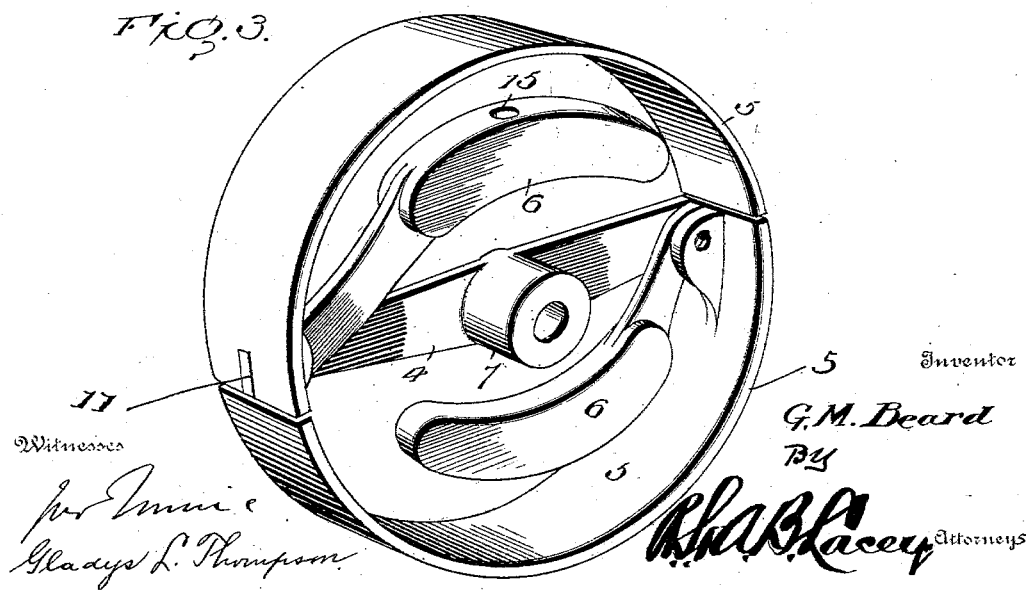
Witnesses
Gladys L. Thompson
Inventor
G. M. Beard
By
Lacey
Attorneys No. 745,559. PATENTED DEC. 1, 1903.
G. M. BEARD.
CLUTCH.
APPLICATION FILED MAR. 24, 1903.
NO MODEL. 2 SHEETS—SHEET 2.

Inventor
G. M. Beard

No. 745,559. Patented December 1, 1903.

UNITED STATES PATENT OFFICE.

GEORGE M. BEARD, OF ANGOLA, INDIANA.

CLUTCH.

SPECIFICATION forming part of Letters Patent No. 745,559, dated December 1, 1903.

Application filed March 24, 1903. Serial No. 149,338. (No model.)

*To all whom it may concern:*

Be it known that I, GEORGE M. BEARD, a citizen of the United States, residing at Angola, in the county of Steuben and State of Indiana, have invented certain new and useful Improvements in Clutches, of which the following is a specification.

This invention provides a clutch of novel construction and automatic in action under certain conditions for connecting or disconnecting a motor from the machine or part driven thereby, the clutch being particularly adapted for use with explosive-engines and mechanically-propelled vehicles.

The clutch comprises a band-pulley, a support mounted coaxially with said band-pulley, friction-grips carried by said support, and weights pivoted to the support and adapted to throw the friction-grips into and out of action, said weights being evenly balanced and governed by tension-springs interposed between them and the friction-grips.

The invention contemplates, in combination with the clutch, means for controlling it independent of the motor, whereby the machine may be thrown into and out of action without stopping the motor, even though the latter is running at or above the predetermined speed.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a section on the line X X of Fig. 2 of a clutch embodying the invention. Fig. 2 is a section on the line Y Y of Fig. 1. Fig. 3 is a perspective view of the support, friction-grips, and weights. Fig. 4 is a view similar to Fig. 2 of a modification. Fig. 5 is a view similar to Fig. 1 of a further modification. Fig. 6 is a section on the line Z Z of Fig. 5 of a still further modification.

Corresponding and like parts are referred to in the following description and indicated in all the views of the drawings by the same reference characters.

The clutch comprises a pulley consisting of band 1, hub 2, and spokes or like connections 3 between parts 1 and 2. The support 4, carrying the friction-grips 5 and weights 6, may be of any construction, and, as shown, consists of a bar having hub 7, upon which is loosely mounted the pulley. The support 4 is secured to shaft 8 of the motor or positively-driven part, thereby enabling the support to acquire a given speed preliminary to operation of the clutch. The support and its adjunctive parts constitute a member of the clutch, and the pulley constitutes a second member, and it is of the utmost importance that these members or parts be mounted in coaxial alinement. While it is preferred to mount the members or parts of the clutch in the manner shown in Figs. 1 and 2, yet it is contemplated to secure same to intermediate shafts, such as indicated in Fig. 4, the shaft 9 being in line with shaft 8 and independent thereof and having the pulley keyed thereto, preferably by extension 10 of hub 2 receiving end of shaft 9, to which it is keyed or otherwise secured for rotation therewith.

The weighted arms 6 are pivoted to opposite ends of support 4 and symmetrically curve in opposite directions and lie upon opposite sides of shaft 8 and are of even weight and disposed so as to exert a uniform force upon the friction-grips 5, this being essential in order to obviate any vibration and insure positiveness and uniformity of action. The weighted arms are extended a short distance from their pivotal ends to form toe portions 11, which are adapted to bear against the free ends of the friction-grips and compel same to engage with band 1 and throw the parts of the clutch into engagement when shaft 8 reaches the given speed determined upon to set the clutch. A tension-spring 12 is interposed between the weighted arms and the adjacent friction-grip and serves to press the weighted ends of the arms toward the axis of the clutch, spring 12 being mounted upon stems 13, extended inward from friction-grips 5 and receiving set-nuts 14, by means of which the tension of springs 12 may be varied. The inner ends of springs 12 enter recesses 15 in the weighted ends of arms 6, and said springs are mounted upon stems 13 and are confined between the tension-nuts 14 and the inner ends of recesses or openings 15. Motion being imparted to shaft 8 causes support 4, carrying the weighted arms and friction-grips, to rotate, and when the required speed has been reached the weights fly outward under centrifugal action and compel friction-grips 5 to engage with band 1 of the pulley, thereby causing the latter to rotate and to impart movement to the machine or other part to be driven connected therewith either by drive-belt or other means common in the mechanic arts for transmitting motion from one part to another. When the speed of shaft 8 from any cause falls below the given speed, the weighted ends of arms 6 move inward under the action of springs 12 and the resiliency of friction-grips 5, thereby permitting the latter to relax their hold upon band 1 and permitting shaft 8 to rotate without imparting any movement to the pulley or machine or part connected therewith.

In the construction shown in Fig. 4, 8 represents the power-driven shaft, and 9 the shaft of the machine or part to be driven, same being connected to the pulley or part of the clutch receiving motion from the friction-grips. This form of clutch transmits motion directly to line-shafting without the intervention of drive-belt or other connecting means.

It is not always desirable or expedient to stop the motor when it is required to stop the machine or other driven part, and to meet this condition the following instrumentalities have been devised for throwing the clutch out of action at will and at a moment's notice: An arm 16 projects from the pivotal end of each weighted arm and lies upon the opposite side of hub 2 and coöperates with a wedge 17, slidably mounted upon hub 2 and connected to collar or yoke 18, mounted upon shaft 8, or coaxially with the clutch, and provided with hand-wheel 19, by means of which collar 18 may be moved so as to throw wedge 17 into such position as either to permit of the weighted arms to act or to prevent their action upon the friction-grips, as may be desired. When the wedge 17 is moved outward, the weighted arms are free to act and to throw the parts of the clutch into engagement, or when wedge 17 is moved inward it exerts a pressure upon arms 16 and prevents the weighted arms flying outward by centrifugal action, thereby holding the clutch out of action, thereby permitting the motor to run while the machine or part to be driven is thrown out of action. The wedge 17 may be a cone or independent blocks. Any means may be employed for operating the wedge, whether the clutch is in motion or stationary.

Weighted arm 6 and auxiliary arm 16 constitute parts of an approximately U-shaped clutch-actuator, being preferably integrally formed. These U-shaped clutch-actuators are oppositely disposed and pivoted at the closed ends or point of divergence of the arms to the grips. The auxiliary arm 16 of one clutch-actuator comes between the wedge and the weighted arm of the other clutch-actuator. Both sets of arms 6 and 18 are in about the same plane. Hence the clutch as a whole is enabled to be constructed of a minimum width.

In Fig. 6 a construction of clutch is illustrated capable of use as a cut-off coupling on line-shaft. This form of clutch is equally well adapted for use with engine as with shaft. The support 4 may be keyed to shaft 8 and provided with either one or both bands 20 and 21 to be connected with the engine by drive-belt in the usual way. The band 20 projects laterally from the plane of band 1, whereas band 21 is in the plane of band 1 and exterior thereto.

Having thus described the invention, what is claimed as new is—

1. In a clutch of the type described, a band and a support mounted in coaxial alinement, spring friction-grips loose at one end and connected at the opposite end to said support, weighted arms pivoted to said support and adapted to cause the friction-grips to engage with said band, and tension-springs interposed between corresponding weighted arms and friction-grips, substantially as described.

2. In a clutch of the type described, a band and a support mounted in coaxial alinement, spring friction-grips loose at one end and connected at the opposite end to said support, weighted arms pivoted to said support and adapted to cause the friction-grips to engage with said band and having recesses in their weighted ends, threaded stems attached to and extended inward from the friction-grips, springs mounted upon said stems and having their inner ends fitted into the recesses of the weighted arms and exerting an inward pressure upon the latter, and set-nuts for regulating the tension of said springs mounted upon the threaded stems, substantially as described.

3. In a clutch of the type described, a band and support coaxially mounted, weighted arms symmetrically curved in opposite directions and pivoted near their outer ends to said support at diametrically opposite points, said arms having toe extensions, spring friction-grips loose at one end and secured at the opposite end to said support, tension-springs interposed between the spring friction-grips and the weighted ends of the pivoted arms, and means for varying the tension of said springs, substantially as set forth.

4. In a clutch of the type described, the combination of a band and support coaxially mounted, friction-grips for coöperation with said band, oppositely-disposed clutch-actuators of approximately U form pivoted at their closed ends to the friction-grips with their arms lying upon opposite sides of the axis of the clutch, the outermost arms being weighted, a wedge for coöperation with the innermost arms to prevent operation of the said clutch-actuators, and means mounted in
5 coaxial alinement with the clutch and connected with said wedge for operation thereof, substantially as specified.

In testimony whereof I affix my signature in presence of two witnesses.

GEORGE M. BEARD. [L. S.]

Witnesses:
STEPHEN A. POWERS,
LEOPOLD C. STIEFEL.